(12) United States Patent
Lee et al.

(10) Patent No.: US 7,470,488 B2
(45) Date of Patent: Dec. 30, 2008

(54) MULTI-COMPONENT COMPOSITE FILM METHOD FOR PREPARING THE SAME

(75) Inventors: Seung-Jin Lee, Taejeon (KR); Hyang-Mok Lee, Taejeon (KR); Soon-Ho Ahn, Taejeon (KR); Jin-Yeon Cho, Seoul (KR); Hyun-Hang Yong, Seoul (KR); Hyung-Keun Lee, Taejeon (KR); Sang-Young Lee, Taejeon (KR); Heon-Sik Song, Tajeon (KR); Soon-Yong Park, Taejeon (KR); You-Jin Kyung, Seoul (KR); Byeong-In Ahn, Taejeon (KR)

(73) Assignee: LG Chemical Co., Ltd., Seoul (KR)

( * ) Notice: Subject to any disclaimer, the term of this patent is extended or adjusted under 35 U.S.C. 154(b) by 228 days.

(21) Appl. No.: 10/110,047

(22) PCT Filed: Aug. 11, 2001

(86) PCT No.: PCT/KR01/01374

§ 371 (c)(1),
(2), (4) Date: Apr. 5, 2002

(87) PCT Pub. No.: WO02/15299

PCT Pub. Date: Feb. 21, 2002

(65) Prior Publication Data

US 2002/0187401 A1 Dec. 12, 2002

(30) Foreign Application Priority Data

Aug. 12, 2000 (KR) ............................... 2000-46735
Mar. 5, 2001 (KR) ............................... 2001-11191

(51) Int. Cl.
*H01M 10/40* (2006.01)
*H01M 2/16* (2006.01)

(52) U.S. Cl. ..................... 429/303; 429/309; 429/144

(58) Field of Classification Search ....................... None
See application file for complete search history.

(56) References Cited

U.S. PATENT DOCUMENTS

| 4,650,730 | A | * | 3/1987 | Lundquist et al. ............. 429/62 |
| 4,731,304 | A | * | 3/1988 | Lundquist et al. ............. 429/62 |
| 5,418,091 | A | | 5/1995 | Gozdz et al. ................ 429/252 |
| 5,631,103 | A | | 5/1997 | Eschbach et al. ............ 429/190 |
| 5,639,573 | A | | 6/1997 | Oliver et al. ................ 429/190 |
| 5,716,421 | A | | 2/1998 | Pendalwar et al. ......... 29/623.2 |
| 5,849,433 | A | | 12/1998 | Venugopal et al. .......... 429/190 |
| 6,322,923 | B1 | * | 11/2001 | Spotnitz et al. ............. 429/144 |

(Continued)

FOREIGN PATENT DOCUMENTS

EP 0082393 6/1983

(Continued)

*Primary Examiner*—John S Maples
(74) *Attorney, Agent, or Firm*—Ladas & Parry LLP

(57) ABSTRACT

The present invention provides a multi-component composite film comprising a) polymer support layer; and b) porous gellable polymer layer which is formed on one side or both sides of the support layer of a), wherein the support film of a) and the gellable polymer layer of b) are unified without the interface, a method for preparing the same, and a polymer electrolyte system applied the same.

6 Claims, 2 Drawing Sheets

U.S. PATENT DOCUMENTS

| | | | |
|---|---|---|---|
| 6,881,515 B2 * | 4/2005 | Wensley | 429/145 |
| 2003/0031924 A1 * | 2/2003 | Lee et al. | 429/142 |

FOREIGN PATENT DOCUMENTS

| | | |
|---|---|---|
| EP | 0 933 824 | 8/1999 |
| JP | 2-14142 | 1/1990 |
| JP | 02-123141 | 5/1990 |
| JP | 04-117436 | 4/1992 |
| JP | 04-342737 | 11/1992 |
| JP | 04-351645 | 12/1992 |
| JP | 04-3511645 | 12/1992 |
| JP | 05-179029 | 7/1993 |
| JP | 07-001574 | 1/1995 |
| JP | 08-104064 | 4/1996 |
| JP | 08-333467 | 12/1996 |
| JP | 09-076441 | 3/1997 |
| JP | 10/151713 | 6/1998 |
| JP | 01-198641 | 8/1998 |
| JP | 10-249974 | 9/1998 |
| JP | 11-263077 | 9/1999 |
| JP | 2000-001554 | 1/2000 |
| WO | 0034384 | 6/2000 |

* cited by examiner

MULTI-COMPONENT COMPOSITE FILM METHOD FOR PREPARING THE SAME

CROSS REFERENCE TO RELATED APPLICATION

This application is based on applications Nos. 2000-46735 and 2001-11191 filed in the Korean Industrial Property Office on Aug. 12, 2000 and on Mar. 5, 2001, the contents of which are incorporated hereinto by reference.

BACKGROUND OF THE INVENTION (a) Field of the Invention

The present invention relates to a multi-component composite film, and a method for the same, and more particularly, to a multi-component composite film used for a polymer electrolyte for electrochemical devices, a method for the same, and a polymer electrolyte system applied the same.

(b) Description of the Related Art

Energy storage technology has drawn attention and has been extensively studied recently, as cellular phones, camcorders, portable computers, and electric motors are commonly use energy storage devices. In particular, a secondary battery that is capable of charging and discharging has drawn the most attention, and new electrodes and polymer electrolytes have been developed to enhance its characteristics, such as cycle life and capacity. The polymer electrolyte is important to fabrication of a stable and high-quality battery, and development of the desired polymer electrolyte is needed.

Electrolytes are classified as liquid electrolyte and solid electrolyte. The liquid electrolyte comprises a salt dissolved and dissociated in an organic solvent, and it has high ionic conductivity. The liquid electrolyte is generally used together with a polymer separator, e.g. a polymer film such as a polyolefin forming pores that has ionic conductivity by filling the liquid electrolyte in the pores. The ionic conductivity varies depending on the porosity of the polymer separator, and the polyolefin separator generally has the ionic conductivity of about 1 mS/cm. But the liquid electrolyte may leak out of the polymer separator due to its high fluidity. In addition, the liquid electrolyte is not adhesive to the polymer separator, and there is an interface between them. The polymer separator has high mechanical strength due to its high crystallinity, and it is neither over-swelled nor decomposed.

The solid electrolyte has an ionic conductivity insufficient to be used in a battery. In order to improve the ionic conductivity of the solid electrolyte, a gellable polymer electrolyte has been suggested, in which liquid electrolyte comprising a salt dissolved in an organic solvent is impregnated in a solid polymer electrolyte, e.g. a hybrid-type electrolyte as disclosed in U.S. Pat. No. 5,418,091, prepared by Bellcore Co. However, when the gellable polymer electrolyte is used for an electrolyte of a battery, there are problems in battery-assembly due to its low mechanical strength, and the polymer electrolyte may be over-swelled, its thickness may increase, and energy density may decrease due to a decrease in the density of the polymer electrolyte, even though the polymer electrolyte has a thickness greater than 50 μm in order to insulate between electrodes and obtain a sufficient mechanical strength in a battery. Furthermore, a plasticizer having a low molecular weight that is harmful to the environment is used, an extraction process thereof is needed, and its mass production is difficult.

The polymer electrolyte requires electrochemical stability in working voltage, and thermal and chemical stability. Preferably, an ionic conductivity of the polymer electrolyte is greater than 1 mS/cm at room temperature, its wet-out rate is better than that of non-aqueous electrolyte, and it has high chemical-resistance. In addition, it is preferable that the polymer electrolyte adhesion is sufficient to decrease the interfacial resistance between the electrolyte and electrodes during a battery-assembly, and that it has enough mechanical strength during the battery-assembly. However, it is known that when the ionic conductivity increases, the mechanical strength of the polymer electrolyte deteriorates, and vice versa.

To increase both the ionic conductivity and the mechanical strength, it is disclosed that a porous polymer layer and a gellable multi-layer film are used for a separator in U.S. Pat. Nos. 5,639,573, 5,716,421, 5,631,103, and 5,849,443, and in European Patent Application No. 0933824A2. The porous polymer layer comprises a material that is hard to swell due to restrictive absorption of liquid electrolyte, and the exemplary material includes polyethylene, polypropylene, polytetrafluoroethylene, polyethylene terephthalate, polybutyleneterephthalate, and polyethylenenaphthalate, and a multi-layer film or bled film thereof. The gellable polymer comprises a self-gellable and self-swellable material when it meets liquid electrolyte, and the exemplary material includes polyvinylidenefluoride, polyurethane, polyethyleneoxide, polyacrylonitrile, polymethylmethacrylate, polyacrylamide, polyvinylacetate, polyvinylpyrrolidinone, and polytetraethylene glycol diacrylate, and a copolymer thereof.

When the aforementioned separator is used, the mechanical properties can be improved, however the polymer electrolyte has ionic conductivity lower than those of the porous polymer and the liquid electrolyte dissolved thereof, resulting from the ionic conductivity-resistance of the gellable polymer. U.S. Pat. Nos. 5,631,103, and 5,849,433 disclose that a plasticizer having a low molecular weight, such as dibutyl phthalate, is used in order to enhance the ionic conductivity of the separator. However, the plasticizer is harmful to the environment, and it makes mass production of a battery difficult. In addition, a multi-layer film prepared by the aforementioned method has a dense gellable polymer layer having no pores, its ionic conductivity-resistance increases undesirably, and an interfacial adhesion strength between the porous polymer layer and the gellable polymer layer weakens.

SUMMARY OF THE INVENTION

It is an object of the present invention to provide a multi-component composite film having electrochemical stability, adhesion to an electrode, good wet-out rate of an electrolyte, which is prepared without extraction or a removal processe of a plasticizer, and with good ionic conductivity and mechanical properties, a preparation method of the same, and a polymer electrolyte system wherein the composite film is used.

In order to accomplish the objects of the present invention, the present invention provides a multi-component composite film comprising:
  a) a polymer support layer film; and
  b) a porous gellable polymer layer which is formed on one side or both sides of the support layer film, wherein the support layer film of a) and the porous gellable polymer layer of b) are united with each other without an interface between them.

It also provides a preparation method of the multi-component composite film comprising the steps of:
  a) preparing a polymer support layer film;
  b) dissolving a gellable polymer in a solvent in order to prepare a gellable polymer solution;

c) forming a gellable polymer layer on one side or both sides of the support layer film of a) by coating the support layer film with the gellable polymer solution of b) in order to prepare a multiple layer; and d) stretching and heat-setting the multiple layer of c).

It also provides a polymer electrolyte system using the multi-component composite film as a separator, and an electrochemical device comprising the same.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

Figure 1:
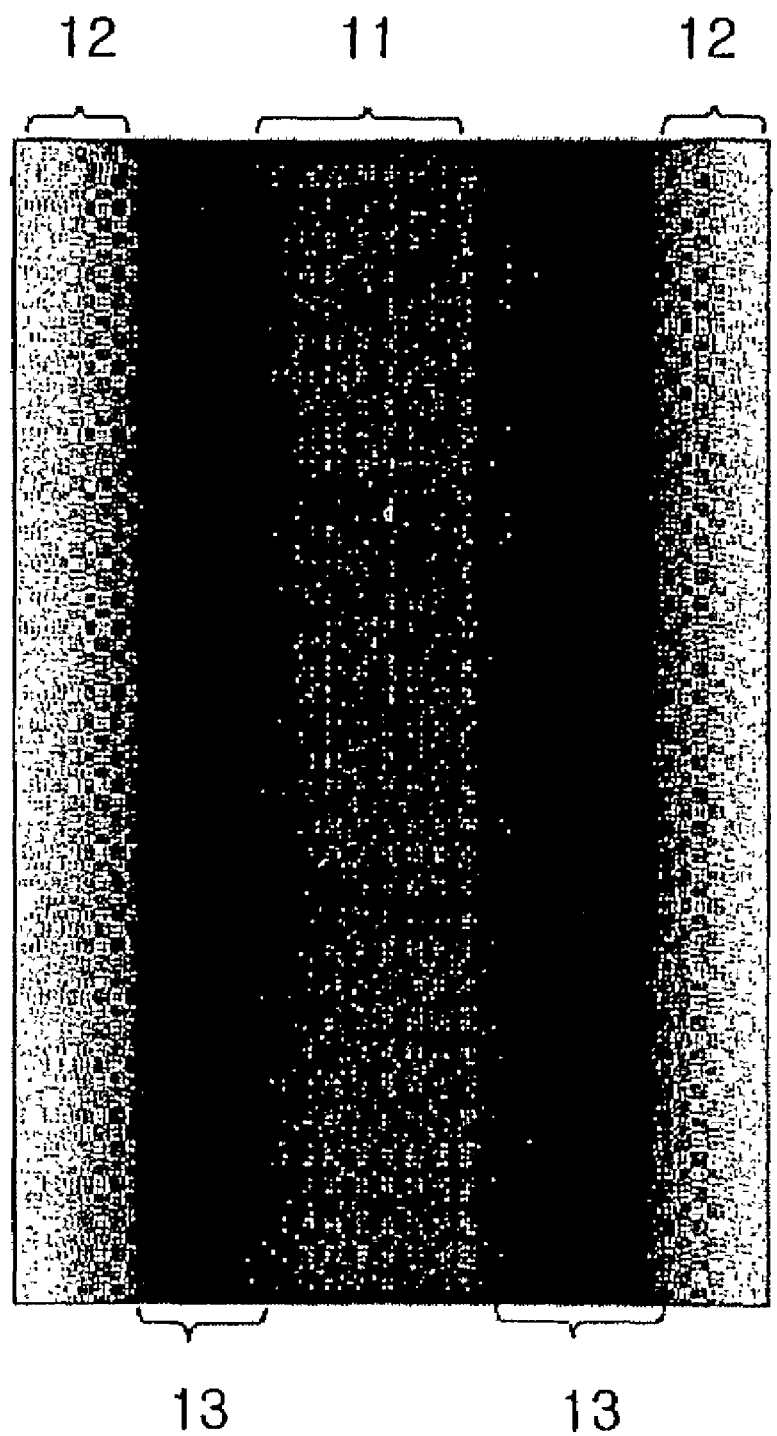
FIG. 1 is a cross-sectional view showing a multi-component composite film structure, wherein gellable polymer layers (12) are located on both sides of a support layer film (11), and the interface (13) between the layers does not appear clearly, after stretching and heat-setting the support layer film (11) coated with a gellable polymer solution.

In these FIGS. "11", "12", and "13" represent a support layer film, a gellable polymer layer, and an interface, respectively.

DETAILED DESCRIPTION OF THE INVENTION

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

The conventional multi-component composite film, which is used as a polymer electrolyte, is prepared by coating a polymer film having pores of a regular size with a gellable polymer solution, so that an interface between the polymer layer and the gellable polymer layer exists. In contrast, a multi-component composite film of the present invention is prepared by coating a common polymer film with a gellable polymer material, forming gellable polymer layers on a common polymer film having no pores and high-temperature-stretching it, so that the film has pores, and so the polymer film and the gellable polymer layer are united with each other without an interface between them.

Since, the polymer support layer film and the gellable polymer are united with each other without an interface between them due to inter-diffusion between them during the high-temperature-stretching process, a mutual bonding force between the support layer and the gellable polymer material increases, and the bonding force is too high for the layers to be separated. The multi-component composite film of the present invention has an interfacial adhesive force greater than at least 100 $g_f$, and preferably greater than at least 150 $g_f$, when the interfacial adhesive force of the present invention is measured by the method according to JIS Z 0237.

A polymer electrolyte system for an electrochemical device using the multi-component composite film is prepared by impregnation of the composite film with an aqueous electrolyte comprising a salt and an organic solvent. In particular, a gellable polymer or polymer-salt complex which is produced from a co-ordinate bond between a gellable polymer and a salt is coated on either or both sides of a support layer film, so that it can be used for an electrolyte for electrochemical devices such as a battery. The polymer electrolyte system may use the gellable polymer that is coated on one side or both sides of the support layer film, or a polymer-salt complex produced from the coordinate bond of the gellable polymer and a salt, for an electrolyte of the electrochemical devices.

Hereinafter, the formation of the multi-component composite film will be described.

The support layer film is preferably prepared by blending or laminating at least one polymer selected from the group consisting of high-density polyethylene, low-density polyethylene, linear low-density polyethylene, polypropylene, high crystalline polypropylene, polyethylene-propylene copolymer, polyethylene-butylene copolymer, polyethylene-hexene copolymer, polyethylene-octene copolymer, polystyrene-butylene-styrene copolymer, polystyrene-ethylene-butylene-styrene copolymer, polystyrene, polyphenylene oxide, polysulfone, polycarbonate, polyester, polyamide, polyamide, polyurethane, polyacrylate, polyvinylidene chloride, polyvinylidene fluoride, polysiloxane, polyolefin ionomer, polymethyl pentene, hydrogenated oligocyclopentadiene (HOCP), and a copolymer thereof, or a derivative thereof.

The high crystalline polypropylene preferably has at least one characteristic selected from the group consisting of a density equal to or greater than 0.905 g/cc, a melting point equal to or higher than 125° C., crystallinity equal to or greater than 50%, isotacticity (or pentad ratio) equal to or greater than 96%, and an atactic ratio of less than 5%.

The material of the gellable polymer layer may be selected according to use of the multi-component composite film, and the gellable polymer is generally at least one selected from the group consisting of polyvinylidene fluoride, polyvinylidene fluoride-chlorotrifluoroethylene copolymer, polyvinylidene fluoride-hexafluoropropylene copolymer, polyethylene oxide, polybutylene oxide, polyurethane, polyacrylonitrile, polyacrylate, polymethyl methacrylate, polyacrylic acid, polyamide, polyacrylamide, polyvinyl acetate, polyvinylpyrrolidone, polytetraethylene glycol diacrylate, polysulfone, polyphenylene oxide, polycarbonate chloride, polysiloxane, polyolefin ionomer, and a copolymer thereof, or a derivative thereof.

The gellable polymer layer preferably comprises a polymer-lithium salt complex so that an ion transference number of the gellable polymer layer increases by anion fixation. The gellable polymer layer may further comprise at least one selected from the group consisting of LiSCN, LiClO$_4$, LiCF$_3$SO$_3$, LiAsF$_6$, LiN(CF$_3$SO$_2$)$_2$, and LiBF$_4$, each having a lithium lattice energy greater than their dissolution energy, which is in accordance with the coordinate bond of an electron-donating element and a lithium ion.

In addition, the gellable polymer layer may further include at least one porous inorganic compound selected from the group consisting of SiO$_2$, TiO$_2$, Al$_2$O$_3$, MgO, and B$_2$O$_3$.

Hereinafter, the preparation method of the multi-component composite film will be described.

The multi-component composite film is prepared by dissolving the aforementioned gellable polymer in a solvent to prepare a coating solution, coating the support layer film with the solution to form a gellable polymer layer on either or both sides of the support layer film, and stretching it to form pores on the support layer film, so that the support layer film and the gellable polymer layer are united together without an interface between them. The stretching process also forms pores in the gellable polymer layer.

The support layer film is preferably prepared by extruding the aforementioned polymer in an extruder equipped with T-die or a tubular die, and annealing it in a dry oven between a room temperature ranging and the greatest melting point in the aforementioned polymers in order to increase its crystallinity and elastic recovery.

In addition, an ion-beam irradiation step can be added to the preparation steps of the multi-component composite film of the present invention with a reactive gas in order to increase the interfacial adhesion strength. The ion beam irradiation modifies the surface of the film, and it can be performed before or after annealing, depending on the properties of the multi-component composite film.

The ion-beam irradiation is performed by placing a support layer film (11) in a high vacuum chamber at $10^{-1}$ to $10^{-6}$ torr, injecting at least one ion source selected from the group consisting of electrons, hydrogen, helium, oxygen, nitrogen, carbon dioxide, air, fluoride, neon, argon, krypton, and $N_2O$ into an ion gun, such that it has an energy ranging from 0.01 to $10^6$ keV, and irradiating the ion-beam on either or both sides of the support layer film with variation of an ion-beam current. The irradiation amount of the ion beam preferably ranges from $10^5$ to $10^{20}$ ions/cm². While the ion-beam is irradiating, at least one reactive gas selected from the group consisting of helium, hydrogen, oxygen, nitrogen, ammonia, carbon monoxide, carbon dioxide, chlorofluoromethane, and $N_2O$ is added to the film at a flow rate of 0.5 to 20 ml/minute in order to modify the surface of the film.

The gellable polymer layer is formed on either or both sides of the support layer film with use of the gellable polymer solution. The gellable polymer solution is prepared by dissolving the aforementioned polymer in a solvent.

The solvent is at least one selected from the group consisting of 1-methyl-2-pyrrolidone (NMP), acetone, ethanol, n-propanol, n-butanol, n-hexane, cyclohexanol, acetic acid, ethyl acetate, diethyl ether, dimethyl formamide (DMF), dimethylacetamide (DMAc), dioxane, tetrahydrofuran (THF), dimethyl sulfoxide (DMSO), cyclohexane, benzene, toluene, xylene, and water, or a mixture thereof. The concentration and coating condition of the gellable polymer solution can be controlled depending on the material used in preparation of the multi-component composite film, and the concentration of the gellable polymer solution preferably ranges from 0.01 to 90 wt %. The gellable polymer solution can be prepared by adding the aforementioned lithium salt, porous inorganic particles, or a mixture thereof to the solvent.

The gellable polymer layer is formed in two ways. First, the support layer film is coated with the gellable polymer solution, and the support layer film is dried under a preferred drying condition to form the gellable polymer layer. Secondly, a release paper or a release film is coated with the gellable polymer solution in order to form the polymer film on the release paper, the coated film is dried under the suitable drying condition, the polymer film is desorbed from the release paper, and the desorbed polymer film is heat-set on the support layer film. The heat-set process is performed at room temperature to a melting point of the support layer or the gellable polymer of the gellable polymer solution.

The preparation of the multi-component composite film is as follows:

First, the first preparation method of the gellable polymer layer comprises:

a) placing the polymer which is used for a support layer in an extruder in order to prepare the precursor film;

b) annealing the precursor film at a temperature equal to or less than a melting point of the polymer;
c) if needed, irradiating an ion beam on either or both sides of the annealed precursor film with a reactive gas;
d) coating a polymer solution on either or both sides of the ion-beam-irradiated precursor film;
e) drying the precursor film;
f) low-temperature-stretching the precursor film at a temperature equal to or less than room temperature;
g) high-temperature-stretching the low-temperature-stretched precursor film at a temperature equal to or less than a melting point of the polymer; and
h) heat-setting the high-temperature-stretched precursor film at a temperature equal to or less than a melting point of the polymer.

Another preparation method of the gellable polymer layer comprises:

a) placing a polymer which is used for a support layer in an extruder in order to prepare a precursor film;
b) annealing the precursor film at a temperature equal to or less than a melting point of the polymer;
c) if needed, irradiating an ion beam on either or both sides of the precursor film with the reactive gas;
d) coating a release film such as a release paper with the gellable polymer solution in order to form a gellable polymer layer on the release film;
e) drying the coated film;
f) desorbing the gellable polymer film from the release film, and heat-setting the gellable polymer layer film on either or both sides of the precursor film;
g) low-temperature-stretching the precursor film heat-set with the gellable polymer layer film at a temperature equal to or less than room temperature;
h) high-temperature-stretching the low-temperature-stretched precursor film at a temperature equal to or less than a melting point of the gellable polymer; and
i) heat-setting the high-temperature-stretched precursor film at a temperature equal to or less than a melting point of the gellable polymer under tension.

In the coating process of the gellable polymer solution on the support layer film or the release film, the coating is performed by various techniques such as dip coating, roll coating, spray coating, spin coating, die coating, and roll coating, and the coating technique is not limited in the coating process. The thickness of the coated films can be controlled depending on a final use of the multi-component composite film, and if the thickness of the support layer film ranges from 1 to 50 μm, the thickness of the gellable polymer layer after coating preferably ranges from 0.01 to 25 μm.

The coating step can be performed either before or after, or both before and after the annealing step, and the ion-beam irradiation process can be added with a reactive gas before the coating process, depending on the properties of the multi-component composite film.

The drying process of the coated gellable polymer solution is preferably performed under a gas atmosphere which is at least one selected from the group consisting of nitrogen, oxygen, carbon dioxide, and air, at a relative humidity of 1 to 100%.

Pores are formed on the heat-gellable polymer layer on either or both sides of the support layer film, after the gellable polymer layer is formed on either or both sides of the support layer film.

In general, pores are formed on a polymer film by phase transition or a dry process. For example, pores can be formed through phase transition by preparation of a polymer solution, and phase transition between the polymer and the solvent with a suitable use of temperature or a non-solvent, and the properties of the prepared film are affected by the phase-transition conditions. For another example, pores can be formed through a dry process by orientation of the crystalline region of the polymer in a certain direction, low-temperature-stretching it, and rupturing the amorphous region which is relatively soft compared to its crystalline region, wherein the properties of the prepared film are affected by the orientation in the crystalline region, and the degree of the orientation.

In the present invention, the stretching process is performed after forming the gellable polymer layer on either or both sides of the support layer film. There are differences between the pore size and distribution of the support layer film and those of the gellable polymer layer. Pores are formed on the support layer by the dry processes, wherein the crystalline structure of a precursor is oriented in a certain direction in preparation of a precursor film, and the oriented precursor film is stretched, thereby forming pores. On other hands, pores are formed on the gellable polymer layer by both the phase transition and dry process, wherein micro-pores or micro-cracks of the gellable polymer layer are formed by phase transition between the gellable polymer and the solvent, and the pore size or the micro-crack size increases due to the stretching process. In particular, the phase transition condition causes the gellable polymer layer to have various types of structure such as a dense structure or a structure having micro-pores or micro-cracks before the stretching process.

Therefore, the pore size and its distribution of the support layer film and the gellable polymer layer are affected by the method of formation of the pores.

The stretching process includes low-temperature-stretching and high-temperature-stretching.

In the high-temperature-stretching process, the gellable polymer layer is formed on either or both sides of the support layer film in order to prepare a multi-layer, the multi-layer is mono-axially or bi-axially stretched at a temperature ranging from 0 to 50° C. with use of a roll or other stretching machine in order to form micro-cracks, and the pores that are formed on the gellable polymer (12) increases.

In the high-temperature-stretching process, the micro-cracks that are formed by the low-temperature-stretching are mono-axially or bi-axially stretched with use of a roll or other stretching machine at between 50° C. and a melting point of the gellable polymer in order to form pores having a desired size, so the mechanical properties of the film are brought about by the high-temperature stretching.

The multi-film that is low-temperature-stretched and high-temperature-stretched is heat-set. The heat-set processing is performed at a temperature ranging from 50° C. to a melting point of the support layer or the gellable polymer layer under tension for 10 seconds to an hour, and the multi-component composite film comprising the support layer film and gellable polymer layer is finally prepared.

The multi-component composite film of the present invention has an improved interfacial adhesion strength between the support layer and the gellable polymer layer due to inter-diffusion between the polymer chains of the support layer and the gellable polymer layer after the high-temperature-stretching and the heat-setting, and the interface between the support layer film and the gellable polymer layer is not well-defined because the support layer film and the gellable polymer layer are united together. In particular, when the ion-beam irradiation on the support layer is performed with the reactive gas, the interfacial adhesion strength between them improves further.

The multi-component composite film, after the high-temperature-stretching and heat-setting, comprises a support layer film having a pore size ranging from 0.001 to 10 μm with a thickness ranging from 1 to 50 μm, and a porous gellable polymer layer having a pore size of 10 μm at most with a thickness ranging from 0.01 to 25 μm, and the film of the present invention is preferably applied to a polymer electrolyte system or an electrochemical device.

FIG. 1 shows an exemplary multi-component composite film of the present invention wherein gellable polymer layers (12) are located on a support layer film (11). It is also shown that the interface between the support layer film (11) and the gellable polymer layer (12) is not well-defined after stretching and heat-setting. The multi-component composite film comprising a united support layer film and a gellable polymer layer without an interface between them has good ionic conductivity, and electrochemical stability.

The preparation steps of the present invention may not only be skipped, but steps may also be added depending on the final use of the multi-component composite film, and the sequence of each of the preparation steps may be changed.

The multi-component composite film of the present invention is applicable to various kinds of separators such as an ultrafiltration membrane, a gas separation membrane, a pervaporation membrane, a reverse osmosis membrane, and a separator for an electrochemical device. In particular, the film of the present invention is preferably applicable to a polymer electrolyte system, since it brings electrochemical stability, adhesion to electrodes, and good wet-out rate of an electrolyte and stability of an electrolyte.

The present invention provides a polymer electrolyte system comprising:

a) i) a porous support layer film; and
   ii) a multi-component composite film comprising a porous gellable polymer layer which is formed on either or both sides of the porous support layer film of a), wherein the support layer film of a) and the gellable polymer layer of b) are united together without an interface between them; and b) a liquid electrolyte comprising i) a salt represented by Formula 1; and
   ii) an organic solvent:

$$A^+B^- \qquad \text{Formula 1}$$

wherein the $A^+$ is at least one selected from the group consisting of an alkali metallic cation, and a derivative thereof, and $B^-$ is at least one selected from the group consisting of $PF_6^-$, $BF_4^-$, $Cl^-$, $Br^-$, $I^-$, $AsF_6^-$, $CH_3CO_2^-$, $CF_3SO_3^-$, $N(CH_3SO_2)_2^-$, and $C(CH_3SO_2)_3^-$.

The multi-component composite film of a) is a polymer membrane, it can be used for a separator and a solid electrolyte, and its air permeability ranges from 100 to 20,000 sec/100 cc.

The liquid electrolyte of b) fills up the pores of the support layer film, and the gellable polymer layer is swelled and gellated when the liquid electrolyte of b) meets the multi-component composite film of a). In order to increase the ionic conductivity of the liquid electrolyte, it is preferable that the thickness of the gellable polymer layer is thinner than that of the support film. The thin thickness of the gellable polymer brings low impedance that is influenced by the thickness of the polymer electrolyte.

The liquid electrolyte of b) comprises a salt represented by Formula 1 that is dissolved and dissociated in an organic solvent of ii).

It is preferable that the organic solvent of b)ii) is at least one selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), and ethyl methyl carbonate (EMC).

The polymer electrolyte system is applicable to various kinds electrochemical devices such as a super capacitor, an ultra capacitor, a secondary battery, a primary battery, a fuel cell, all kinds of sensors, a machine for electrolysis, and an electrochemical reactor.

The following Examples and Comparative Examples illustrate the present invention in further detail, but the present invention is not limited by these Examples.

EXAMPLES

Example 1

A high crystalline polypropylene was used as a support layer film, and a polyvinylidenefluoride-chloro-tri-fluoroethylene copolymer (a product of Solvay Polymer Corp.) was used as a gellable polymer layer, in order to prepare a multi-component composite film by the following procedure.

(Preparation of a Precursor Film)

A high crystalline polypropylene was used for a material of a precursor film. It had a melt index of 2.0 g/10 minutes, a density of 0.91 g/cc, a melting point of 166.5° C. which was measured with DSC (Differential Scanning Calorimeter), a crystallization temperature of 116.5° C., a crystallinity of 57%, an isotacticity of 98% which was measured with $C^{13}$ nuclear magnetic resonance (NMR), and an atactic fraction of about 2% which was measured after being dissolved in xylene. The precursor film was prepared from the high crystalline polypropylene with use of a single screw extruder equipped with a T-die and a take-up device. The extrusion temperature and cooling-roll temperature were respectively 220° C. and 80° C. The take-up speed was 20 m/min., and the draw down rate (DDR) was 60.

The precursor film was annealed in a dry oven at 150° C. for an hour.

(Coating)

After annealing, the solution that was dissolved in acetone was dip-coated on both sides of the prepared precursor film. The coating was performed under air while maintaining 60% relative humidity, and the acetone was vaporized at the same condition of 60% relative humidity.

(Stretching)

The coated precursor film was mono-axially low-temperature-stretched to 50% of the stretching ratio based on the initial length of the film at room temperature, and it was further mono-axially low-temperature-stretched to 100% of the stretching ratio based on the initial length of the film at room temperature.

(Heat-setting)

After low-temperature-stretching, the low-temperature-stretched precursor film was heat-set at 140° C. under tension for 10 minutes, and it was cooled in order to prepare a multi-component composite film. The properties of the multi-component composite film were measured, and the properties are shown in Table 1.

The air permeability and interfacial adhesion strength of the multi-component composite film were respectively measured by JIS P8117 and JIS Z0237, its pore size was measured with a scanning electron microscope, and wet-out rate of an electrolyte was measured by measuring a time for wet-out of 2 $cm^2$ of the multi-component composite film in an electrolyte wherein ethylene carbonate and dimethyl carbonate are mixed together in a volume ratio of 4:6.

Example 2

(Preparation of a Percursor Film)

A precursor film was prepared in the same manner as in Example 1.

(Coating)

A release paper was dip-coated with a gellable polymer solution wherein polyvinylidenefluoride-chlorotrifluoro ethylene copolymer 32008 (a product of Solvay Polymer Corp.) was dissolved in an acetone, so that a gellable polymer layer was prepared. The coating was performed under air while maintaining 60% relative humidity, and the acetone was vaporized at the same condition of 60% relative humidity.

(Heat-melting)

2 pieces of the gellable polymer layer were desorbed from the release film, 2 pieces of the gellable polymer layer were located on both sides of the precursor film, and they were placed in a heated laminator of which the temperature was 140° C., so that the gellable polymer layer was heat-melted on both sides of the precursor film.

(Stretching)

The heat-melted film was mono-axially stretched to 50% of the stretching ratio based on the initial length of the film at room temperature, and it was further mono-axially high-temperature-stretched to 100% of the stretching ratio based on the initial length of the film at 140° C.

(Heat-setting)

After high-temperature-stretching, the high-temperature-stretched film was heat-set at 140° C. under tension for 10 minutes, and it was cooled to prepare a multi-component composite film. The properties of the multi-component composite film were measured, and they were same as those of the multi-component composite film according to Example 1.

Example 3

(Preparation of a multi-component composite film comprising high crystalline polypropylene/polyvinylidenefluoride-chlorotrifluoroethylene copolymer that was prepared by a preparation process comprising ion-beam irradiation)

A multi-component composite film was prepared in the same manner as in Example 1, except that an ion-beam was irradiated on the precursor film before coating the precursor film with the gellable polymer solution. The precursor film was placed in a vacuum chamber while keeping the pressure ranging from $10^{-5}$ to $10^{-6}$ torr, argon cations ($Ar^+$) were irradiated on both sides of the precursor film with an ion gun, and simultaneously oxygen used as an reactive gas was injected into the chamber in an amount of 4 ml/$cm^2$ in order to treat the precursor film surface. The energy of the ion beam was 0.5 keV, and the ion irradiation amount was $10^{16}$ ions/$cm^2$.

After the ion-beam irradiation, a multi-component composite film was prepared in the same manner as in Example 1, and its properties were measured in the same manner as in Example 1. Its properties are shown in Table 1.

In Table 1, it is shown that pores were formed on both the support layer and the gellable polymer layer as in Example 1, and in particular, the interfacial adhesion strength between the support layer and the gellable polymer layer and the wet-out rate of the electrolyte were appreciably improved.

Example 4

(Preparation of a multi-component composite film for a polymer electrolyte, that is prepared from high-density polyethylene/polyvinylidenefluoride-chlorotrifluoroethylene copolymer)

A multi-component composite film was prepared in the same manner as in Example 1, except that a high-density polyethylene was used for a support layer instead of high crystalline polypropylene.

The high-density polyethylene had a melt index of 0.3 g/10 min and a density of 0.964 g/cc. A precursor film was prepared in the same manner as in Example 1. The extrusion temperature and cooling-roll temperature of the take-up device were respectively 200° C. and 80° C., the take-up speed of the film was 30 m/min, and the draw-down ratio of the film was 80. The prepared precursor film was annealed in a dry oven at 125° C. for 1 hour. Both sides of the annealed precursor film were coated with a gellable polymer solution in the same manner as in Example 1. The coated precursor film was mono-axially stretched at room temperature to 50% of the stretching ratio based on the initial length of the film, and then it was immediately mono-axially high-temperature-stretched to 50% of the stretching ratio based on the initial length of the film, at 120° C. The high-temperature-stretched film was heat-set at 120° C. under tension for 10 minutes, and then a multi-component composite film was prepared by cooling the heat-set film. Properties of the multi-component composite film are shown in Table 1.

In Table 1, it is shown that pores formed on both the support layer and the gellable polymer layer as in Example 1, and the interfacial adhesion strength and wet-out rate of the electrolyte improved.

Comparative Example 1

A polymer electrolyte was prepared by the conventional method, wherein a porous support film was coated with a gellable polymer solution.

Celgard2400 (a product of Celanese Co.) prepared from only polypropylene was used for the porous support film, and polyvinylidenefluoride-chlorotrifluoroethylene copolymer 32008 (a product of Solvay Polymer Corp.) was used for a gellable polymer layer as in Example 1. After preparing a gellable polymer solution, the porous Celgard2400 was coated with the gellable polymer solution, and it was dried in order to prepare a multi-layer film. The properties of the multi-layer film were measured, and they are shown in Table 1.

Comparative Example, and the multi-component composite film of Example 1 has an improved air permeability due to the pores. In addition, it is also shown that the interfacial adhesion strength between the support film and the gellable polymer layer, and a wet-out rate of an electrolyte according to Example 1 are improved compared to those of Comparative Example 1.

Example 5

The multi-component composite film of Example 1 was impregnated in an organic electrolyte solution (EC and EMC were used in a volume ratio of 1:2) comprising 1 M $LiPF_6$ used for a lithium salt, and Li/a separator comprising the multi-component composite/SUS cell was fabricated, wherein the SUS was used as an electrode, and the Li metal was used as a counter-electrode in order to measure a linear sweep voltametry of the cell at room temperature and a voltage ranging from 3 to 6V by 1 mV/sec.

Figure 2:
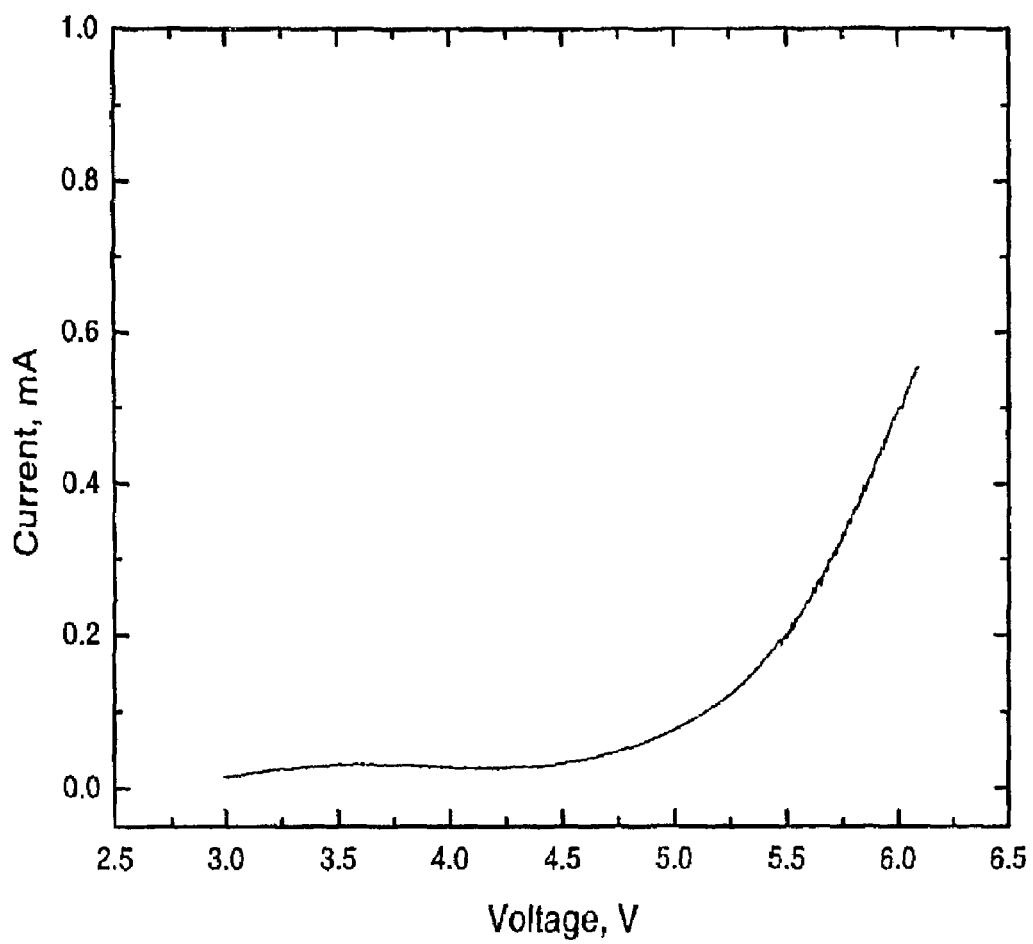
FIG. 2 is a graph showing a Linear Sweep Voltametry analysis of a cell having the structure of the Li/multi-component composite film according to Example 2 of the present invention/SUS, wherein the gellable polymer film comprises polyvinylidene fluoridechlorotrifluoroethylene, and the support layer film comprises polypropylene.

FIG. 2 is a graph illustrating the result of the linear sweep voltametry of the cell, and it is observed that the multi-component film of Example 1 was capable of being used for a polymer electrolyte due to its electrochemical stability at a voltage equal to or less than 5V.

The conventional multi-component composite film for a polymer electrolyte has air permeability too low to be measured, but the multi-component composite film of the present invention has an air permeability ranging from 500 to 600 sec/100 cc, so that pores are formed on the gellable polymer layer as well as the support layer film having micro-pores.

The gellable polymer layer of the multi-component composite film has as dense a structure as that of the conventional film for a separator, and pores can be formed on the gellable layer, so that the gellable polymer layer of the multi-component composite film has a highly improved permeability. In addition, the support layer has properties that are the same to those of the micro-porous separator prepared by the conventional dry process, and the gellable polymer has various morphologies due to preparation process conditions.

The conventional multi-layer for a separator has an interfacial adhesion strength of 75 $g_f$, and the multi-component composite film of the present invention has a high interfacial adhesion strength ranging from 150 to 250 $g_f$. It is supposed

TABLE 1

|  |  | Example 1 | Example 2 | Example 3 | Example 4 | Comparative Example 1 |
|---|---|---|---|---|---|---|
| Thickness (μm) | Support layer | 17 | 17 | 19 | 19 | 25 |
|  | Gellable polymer layer | 1 | 1 | 1 | 1 | 1 |
| Pore size (μm × μm) | Support layer | 0.3 × 0.1 | 0.3 × 0.1 | 0.3 × 0.1 | 0.4 × 0.1 | 0.3 × 0.1 |
|  | Gellable polymer layer | 0.8 × 0.3 | 0.8 × 0.3 | 0.8 × 0.3 | 0.6 × 0.3 | Not capable of observation |
| Air permeability (sec/100 cc) |  | 520 | 520 | 525 | 600 | Not capable of measurement |
| Interfacial adhesion strength ($g_f$) |  | 160 | 160 | 230 | 220 | 75 |
| Wet-out rate of an electrolyte (sec) |  | 9 | 9 | 7 | 8 | 42 |

In Table 1, it is shown that pores were formed on both the support layer film and gellable polymer in Example 1, compared to that pores forming on only the support layer film in that the high interfacial adhesion strength of the present invention results from the high-temperature-stretching and heat-setting processes, wherein the mutual bond strength between polymer chains of the support layer and the gellable polymer layer forms. The interfacial adhesion strength is capable of increasing further by performing ion-beam irradiation. In addition, the multi-component composite film has a highly enhanced wet-out rate of an electrolyte due to the improved interfacial adhesion strength and various morphologies.

The enhanced wet-out rate of an electrolyte brings a battery to stability, since the leak-out amount of the electrolyte can be decreased, and the cycle life characteristics do not deteriorate during repetitive charging and discharging, because the leak-out amount of the electrolyte decreases due to the enhanced wet-out rate.

The multi-component composite film of the present invention has good electrochemical stability, adhesion to an electrode, a wet-out rate of an electrolyte and stability, and even though extraction or removal processes of a plasticizer are not performed, it has both good ionic conductivity and mechanical properties, such that the film of the present invention can be used in a polymer electrolyte system, electrochemical devices, and a separator.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A multi-component composite membrane comprising:
   a) a polymeric support layer film having a pore size ranging from 0.001 µm to 10 µm; and
   b) a porous gellable polymer layer formed on one side or both sides of the polymeric support layer film comprising a polymer-lithium salt complex and having a pore size of less than 10 µm,
      wherein the polymeric support layer film comprises at least one material selected from the group consisting of high-density polyethylene, low-density polyethylene, linear low-density polyethylene, polypropylene, high crystalline polypropylene, polyethylene-propylene copolymer, polyethylene-butylene copolymer, polyethylene-hexene copolymer, polyethylene-octene copolymer, polystyrene-butylene-styrene copolymer, polystyrene-ethylene-butylene-styrene copolymer, polystyrene, polyphenylene oxide, polysulfone, polycarbonate, polyester, polyamide, polyurethane, polyacrylate, polyvinylidene chloride, polyvinylidene fluoride, polysiloxane, polyolefin ionomer, polymethyl pentene, hydrogenated oligocyclopentadiene (HOCP), and a copolymer thereof or a derivative thereof,
   the polymer of the polymer-lithium salt complex is at least one material selected from the group consisting of polyvinylidene fluoride, polyvinylidene fluoride-chlorotrifluoroethylene copolymer, polyvinylidene fluoride-hexafluoropropylene copolymer, polyethylene oxide, polypropylene oxide, polybutylene oxide, polyurethane, polyacrylonitrile, polyacrylate, polymethyl methacrylate, polyacrylic acid, polyamide, polyacrylamide, polyvinyl acetate, polyvinylpyrrolidone, polytetraethylene glycol diacrylate, polyphenylene oxide, polyester, polyvinylidene chloride polysiloxane, polyolefin ionomer, and a copolymer thereof,
   the lithium salt of the polymer-lithium salt complex is at least one lithium salt selected from the group consisting of LiSCN, LiClO$_4$, LiCF$_3$SO$_3$, LiAsF$_6$, LiN(CF$_3$SO$_2$)$_2$, and LiBF$_4$,
   the polymeric support layer film and the gellable layer are joined directly to each other, and an interfacial adhesive strength measured by the method according to JIS Z 0237 between the polymeric support layer film and the porous gellable polymer layer is from 150 to 250 g$_f$, and
   an air permeability of the multi-component composite membrane is from 100 to 20,000 sec/100 cc.

2. The multi-component composite membrane according to claim 1, wherein the high crystalline polypropylene has at least one property selected from the group consisting of a density equal to or greater than 0.905 g/cc, a melting point equal to or greater than 164° C., a crystallization temperature equal to or greater than 125° C., crystallinity equal to or greater than 50%, isotacticity (or a Pentad ratio) equal to or greater than 96%, and atactic ratio less than 5%.

3. The multi-component composite membrane according to claim 1, wherein the polymeric support layer film of a) is a blended film or a laminated film.

4. The multi-component composite membrane according to claim 1, wherein the gellable polymer layer comprises at least one porous inorganic particle selected from the group consisting of SiO$_2$, TiO$_2$, Al$_2$O$_3$, MgO, and B$_2$O$_3$.

5. The multi-component composite membrane according to claim 1, wherein a thickness of the polymeric support layer film ranges from 1 to 50 µm, and a thickness of the porous gellable polymer layer ranges from 0.01 to 25 µm.

6. A polymer separator comprising the multi-component composite membrane according to claim 1.

* * * * *